Dec. 31, 1929.     K. E. LYMAN     1,741,862
AUTOMATIC TRANSMISSION
Filed Aug. 1, 1928     3 Sheets-Sheet 2

INVENTOR.
KENNETH E. LYMAN
BY *[signature]*
ATTORNEY

Dec. 31, 1929.　　　　K. E. LYMAN　　　　1,741,862
AUTOMATIC TRANSMISSION
Filed Aug. 1, 1928　　　3 Sheets-Sheet 3

INVENTOR
KENNETH E. LYMAN
BY
ATTORNEY

Patented Dec. 31, 1929

1,741,862

UNITED STATES PATENT OFFICE

KENNETH E. LYMAN, OF ROCKFORD, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed August 1, 1928. Serial No. 296,646.

The present invention relates in general to power transmitting mechanisms and has particular reference to an improved automatic transmission, which is especially adaptable for use in connection with motor driven vehicles.

The principal object of the invention resides in the provision of a mechanism of the character described which is capable of establishing a gradual speed ratio variation, from zero to maximum, and controlled automatically by a variable condition existing in the mechanism.

While the foregoing explains briefly the nature of the invention other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

Figure 1:
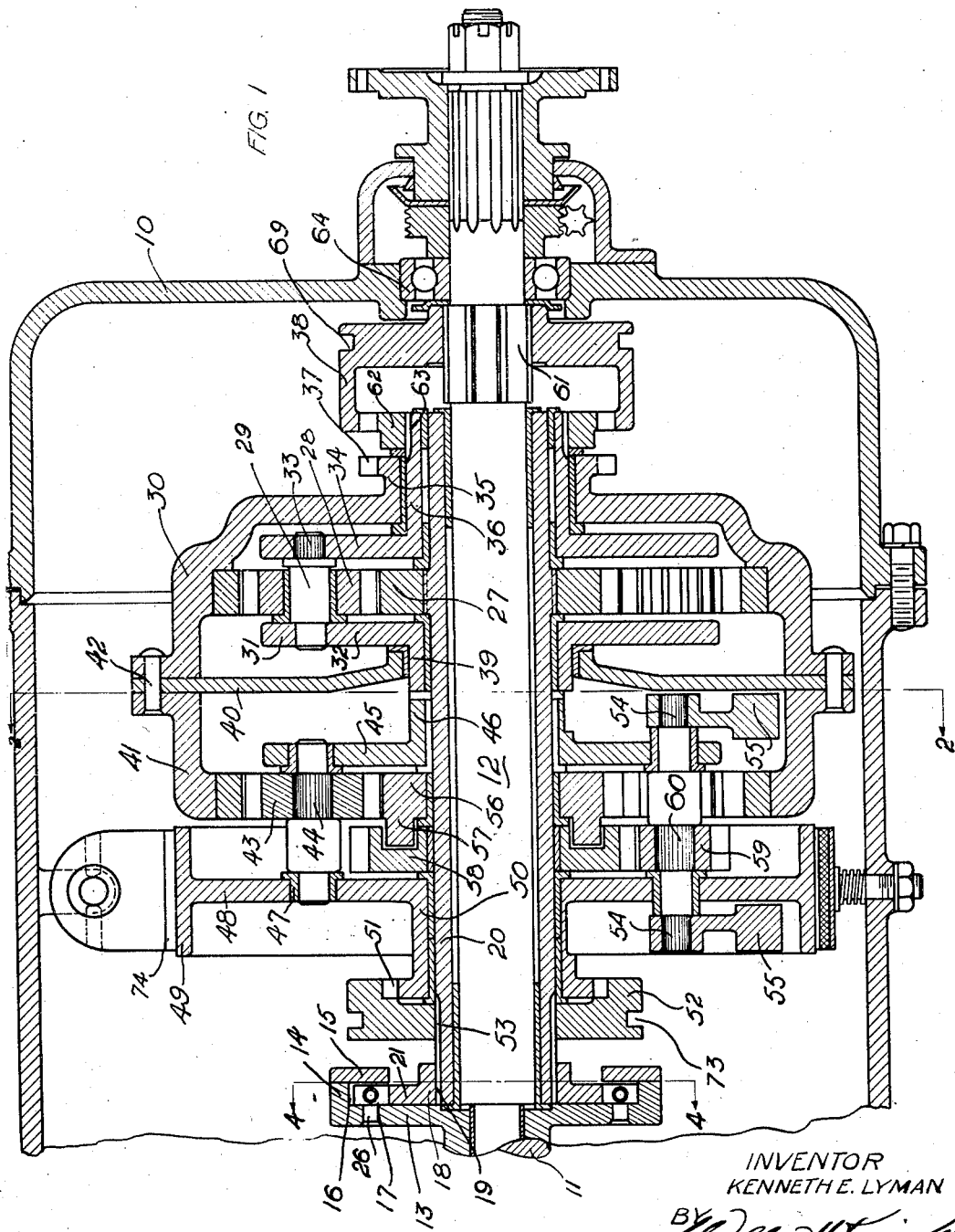
Figure 1 is a horizontal section of the transmission taken on the line 1—1, Figure 2 and looking in the direction of the arrows.

Referring now to the drawings in detail, the transmission is inclosed in a housing 10 in which extends a driving shaft 11 from one side and a driven shaft 12 from the opposite side. The driving shaft is constructed with a radial flange 13 having a forwardly extending projection 14 and a downwardly depending continuation 15 thereof, to provide an annular recess 16 for accommodating the flexible connection 17. The flexible connection includes a short sleeve 18 which is splined as at 19 on the sun gear sleeve 20. The web or ring member 21 of the sleeve 18 is constructed with radial projections 22 arranged in annular spaced relation to provide a series of recesses 23 for accommodating a pair of coil springs 24. One end of the springs in each pair abut against the sides of the projections 22 with their opposite ends abutting against a block 25 which is fixed with the radial flange 13 by means of rivets, pins or the like 26.

The purpose of this flexible connection is to avoid introducing irregular frequencies and pulsations into the transmission so as to develop an even drive in the mechanism.

The sun gear sleeve 20 is mounted with freedom of rotation on the driven shaft 12, and carries intermediate its end, sun gear 27 which is in constant mesh with a plurality of planetating gears 28 journaled with freedom of rotation on the planet shafts 29 and also in constant mesh with the part 30 of a double ring gear. The planet shafts 29 have one end journaled as at 31 in a carrier 32 with their opposite ends splined or otherwise fixed to the carrier 34. The part 30 of the double ring gear is made with a sleeve 35 which is journaled on the sleeve 36 of the carrier 34. The sleeve 35 of the part 30 of the ring gear is made with clutch teeth 37 which are adapted to mesh with the teeth on a dog clutch 38 when the clutch is axially shifted, as and for the purpose which will be hereinafter more specifically described. The sleeve 39 of the carrier 32 is journaled on the sleeve 20 of the sun gear and supports a web member 40 which separates the part 30 of the double ring gear from the part 41. The connection between the parts 30 and 41 of the double ring gear is made in any manner suitable for the purpose, as for example, the bolts, rivets or the like 42.

The part 41 of the double ring gear is made with teeth which are in constant mesh with a plurality of secondary planetating gears 43 which are splined or otherwise fixed to rotate with the planetary shafts 44. These shafts are journaled at one end in a carrier 45 which in turn is journaled by a sleeve 46 on the sleeve 20 of the sun gear 27. The opposite ends of these shafts are journaled as at 47 in the web 48 of a brake wheel 49.

The brake wheel 49 is made with a sleeve 50 which is journaled on the sun gear sleeve 20 and terminates in a clutch ring 51, which is adapted to be engaged by the dog clutch 52 when the same is shifted axially on its splined connection 53 with sun gear sleeve 20. Some of the secondary planetating shafts 44, three as an example, are made longer than the others so that they project beyond their journaled mountings in the carrier 45 and the web 48 to provide mounting ends 54 for the centrifugal weights 55, in this way two sets of weights, three in each set, are mounted on opposite sides of the secondary planetating system.

The secondary planetating gears 43 are in constant mesh with the secondary sun gear 56 which is connected by a one-way clutch 57 with still another sun gear 58, the latter being in constant mesh with still another set of planetating gears 59 which are fixed as at 60 on the secondary planetating shafts 44 which carry the weights 55.

The dog clutch 38 is splined as at 61 on the driven shaft and axially shiftable thereon so as to be moved out of engagement with the clutch ring 62 into engagement with clutch teeth 37 on the sleeve 35 of the part 30 of the double ring gear. It may also be shiftable into a neutral position out of engagement with both the clutch ring 62 and the teeth 37. The clutch ring 62 is fixed as at 63 on the sleeve 36 of the carrier 34. The driven shaft is supported in one side of the housing 10 by a suitable bearing 64 as illustrated.

Figure 2:
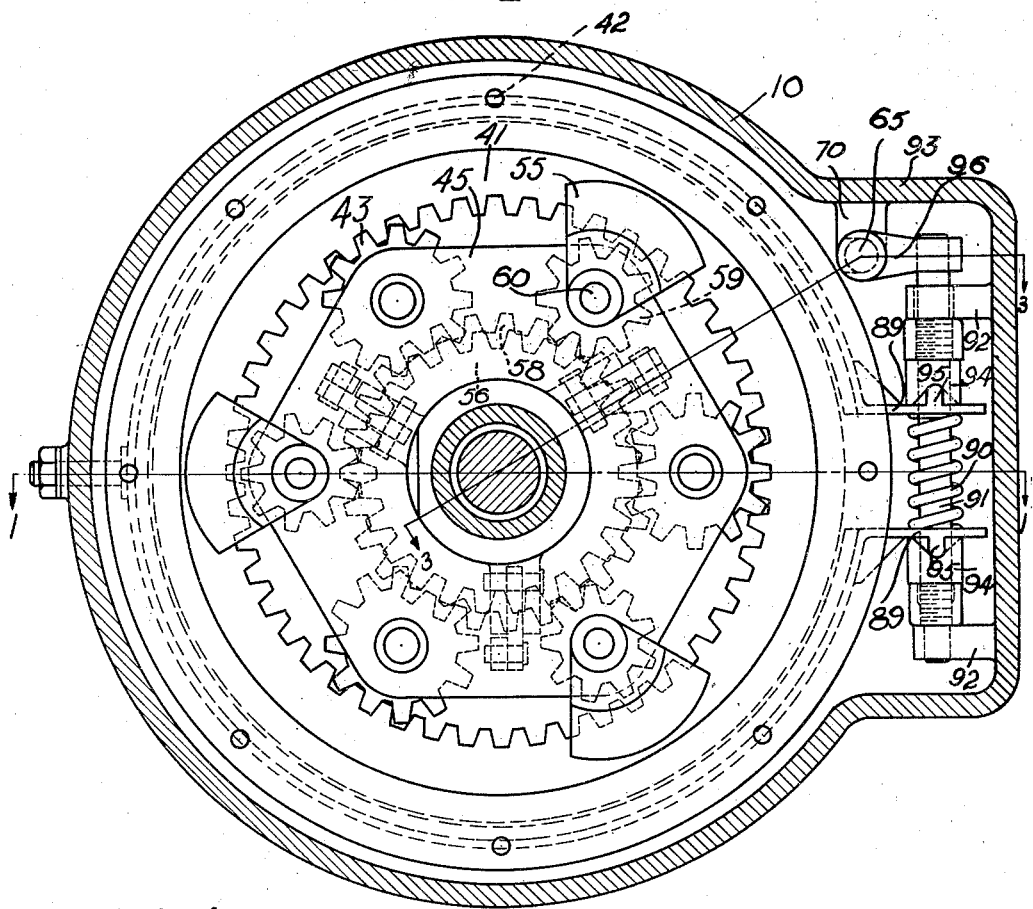
Figure 2 is a vertical section of the transmission taken on the line 2—2, Figure 1 and looking in the direction of the arrows.
Figure 4:
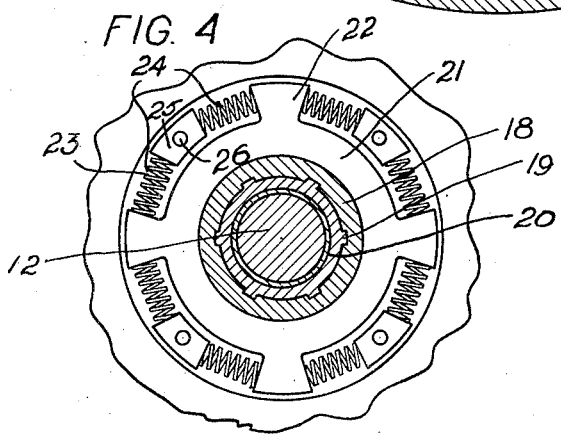
Figure 4 is a detailed section taken on the line 4—4, Figure 1 and showing in elevation a flexible connection in the drive.

The power input in this mechanism is taken in through the sun gear 27 which causes the double ring gear represented by the parts 30 and 41 to rotate in an anti-clockwise direction as viewed from Figure 2. The drive at low speeds is thus imparted from the sun gear 27 to the carrier 34 through the clutch ring 62 to the clutching dog 38 then to the driving shaft 12. This will establish a forward drive at low speeds with the desired multiplication of torque.

Rotation of the double ring gear in a counter clockwise direction as viewed from Figure 2 will establish a planetating movement in the secondary planetating system of which the planetating gears 43 and the sun gear 56 form a part. Rotation of the secondary sun gear 56 will impart rotation to the cooperating sun gear 58 through means of the over-running clutch 57. Rotation of the sun gear 58 will set up a planetating movement in the planetating gears 59 which will react on the weights 55 as a centrifugal force.

At predetermined speeds in the driving shaft 11 the centrifugal force imparted to the weights 55 will have a tendency to establish a retarding effect in the planetating movement of the secondary planetating system of which the planetating gears 43 and the sun gear 56 forms a part. This retarding effect is controlled by the speed of the driving shaft so that at predetermined speeds in the driving shaft the effect will be increased to an extent, whereby the retarding force will be sufficient to arrest the backward or counterclockwise rotation of the double ring gear which in turn will arrest the planetating movement in the primary planetating system so that the mechanism will be automatically thrown into a one to one drive. When the mechanism is operating in a one to one drive, the double ring gear is rotating in a clockwise direction viewed from Figure 2 and in just a reversed direction to which it rotates when the mechanism is in a speed ratio. It will thus be seen that before the mechanism can be automatically thrown into a one to one drive the reverse rotation of the double ring gear must be first completely arrested and then it will commence to revolve in a clockwise direction or in the direction of the drive.

To establish a reverse drive in the mechanism the dog clutch 38 must be moved into clutching engagement with the teeth 37 on the sleeve 35 of the part 30 of the double ring gear. Likewise, the dog clutch 52 must be thrown out of clutching engagement with the clutching ring 51 on the sleeve 50 of the web 48 of the brake wheel 49 and the brake wheel 49 held against rotation. Furthermore the carrier 32 must likewise be locked against rotation, which, of course, will also lock the carirer 34 on account of the connection of the two carriers by means of the planetating shafts 29.

To establish this reverse I prefer to employ a convenient manually manipulated means which in its preferred form comprises a shiftable rod or shaft 65 which enters the housing 10 from one side and terminates in a sliding projection 66 on the other side. This shaft 65 is thus slidably mounted in the housing and may thus be shifted by any means such as a lever, located conveniently accessible to the driver. The shifting of this shaft forms three primary operations and one secondary operation all of which are essential to the reverse of the drive. It is also interesting to note that all four of these operations result from a movement of the shaft in one direction. Projecting radially from the shaft 65 within the housing 10 is an arm 67 which carries a yoke 68 which in turn is engaged in the annular groove 69 in the circumference of the clutching dog 38.

Figure 3:
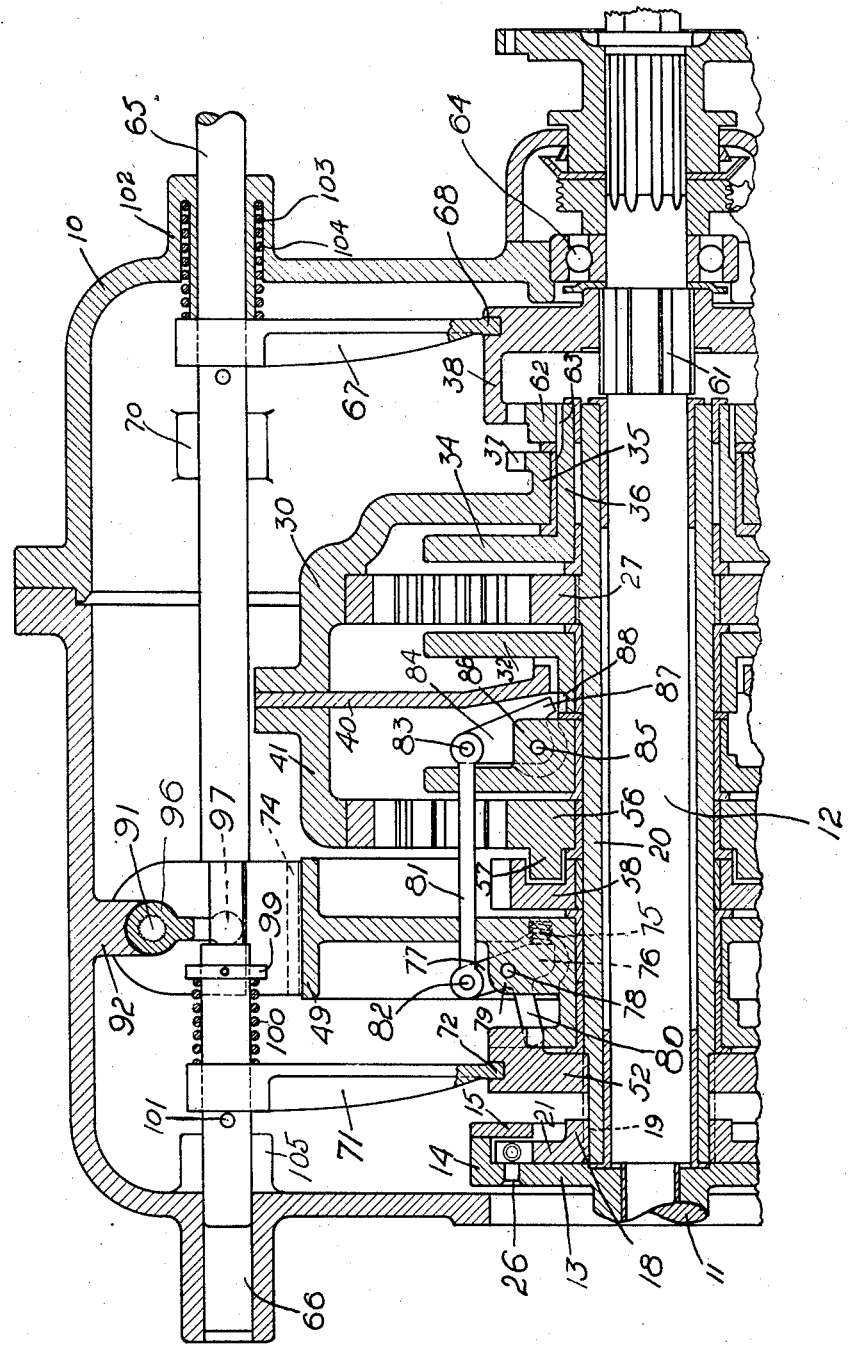
Figure 3 is another sectional view of the transmission taken on the line 3—3, Figure 2 and looking in the direction of the arrows.

Therefore, shifting of the shaft 65 to the left as viewed from Figure 3 will cause the clutching dog 38 to move into engagement with the teeth 37 on the part 30 of the double ring gear and thus connect the double ring gear in driving relation with the driven shaft 12. The sliding movement of the shaft 65 is guided intermediate the ends of the housing by a guide block 70. This sliding movement of the shaft 65 to the left as viewed from Figure 3 will also carry with it the arm 71 which is fixed on the shaft and has a yoke 72 engaging in the annular groove 73 in the circumference in the clutching dog 52; thus the clutching dog 52 is moved to the left as viewed from Figures 1 and 3 to release its engagement with the clutch teeth 51 which will thus release the brake wheel 49 from driving relation with the sleeve 20 of the sun gear 27 or in other words the wheel will be released from driving relation with the driving shaft. As these two operations take place the brake band 74 n the brake wheel 49 is tightened up so that the wheel is locked against rotation. The means for actuating the brake band 74 will be presently described.

As the clutching dog 52 is moved out of engagement with the clutch teeth 51, the stored tension of the spring 75 will impart an outward thrust on the heel piece 76 of the rocker arm 77. This rocker arm 77 is pivoted as at 78 on an ear 79 projecting from the side of the web 48 of the brake wheel 49. The rocker arm is further provided with a projecting finger 80 which bears against the clutching dog 52 when the dog is in engagement with the clutch teeth 51.

When the clutching dog 52 is moved out of engagement with the teeth 51, the spring 75 as stated imparts a thrust to the heel piece 76 which rocks the arm 77 about its pivot 78 and imparts a thrust to the right, as viewed from Figure 3, to the lever 81 which is pivoted as at 82 to the rocker arm 77. The opposite end of the lever 81 is pivoted as at 83 to a clutching member 84 which in turn is pivoted as at 85 to a boss 86 on the side of the carrier 45. The clutching member 84 is made with a toe piece 87 which is adapted to engage with the back stop teeth 88 on the sleeve 39 of the carrier 32.

From this description it will readily be seen that the spring 75 will impart a thrust to the lever 81 rocking the clutching member about the pivot 85 and causing the toe piece 87 to engage with the back stop teeth 88 on the carrier 32 thus locking the carrier against rotation.

The brake band 74 is caused to grip the braking surface on the circumference of the brake wheel 49 by drawing the attaching ears 89 together against the resistance of the spring 90 which is coiled around the draw rod 91. The draw rod is supported by the bracket arms 92 which project from the side of an extension 93 on the casing 10. Carried by the draw rod 91, between the bracket supports 92 and the attaching ears 89, are cam members 94 which are adapted to coact with the projections 95 on the sides of the attaching ears 89. Thus rotation of the draw rod 91 will cause the camming members 94 to move the attaching ears 89 together or at least toward each other which will bring the brake band into clamping engagement with the braking surface of the brake wheel. The draw rod is rotated by means of its splined or fixed relation with the rocker arm 96, the end 97 of which being engaged by the shaft 65 so that sliding movement of the shaft will impart rotation to the draw rod 91 through its connection with the rocker arm 96.

Coiled around the shaft 65 between the collar of the arm 71 and the abutment 99 is a spring 100 which serves to hold the collar 71 against the stop pin 101 and also imparts a thrust to the right, viewed from Figure 3, to the rocker arm 96. The bearing support 102 of the shaft 65 at the opposite end of the housing 10 is made with a recess 103 for accommodating a coil spring 104 which imparts a thrust to the left, viewed from Figure 3, to the collar of the arm 67.

The purpose of the over-running clutch 57 in the assembly is to permit the supplemental sun gear 58 to rotate faster than the secondary sun gear 56 so that accelerating force of the weights will not interfere with the effectiveness of the retarding forces transmitted to the primary planetating system. The particular manner of mounting the double ring gear makes it a floating ring gear, so to speak, which is common to both the primary and secondary systems and through which the planetating motion in the primary system is controlled. In other words it is an interconnecting member between the two planetating systems.

As previously stated, the drive is put into the sun gear of the primary system and because the carrier for the primary planetating gears is held stationary by reason of its connection through the dogging clutch 38 with the driven shaft, the ring gear is rotated backwards. The planet carrier of the secondary planetating system, however, is rotated forward by reason of its connection with the driving shaft through the clutching device 52, consequently, the weights 55 are rotating at a speed much in excess of any speed which they could develop were they connected to or rather directly subject to the speed of rotation of the planetating gears in the primary system. The result of this assembly is increased inertia forces and high frequency of impulses and as a further result, a very effective control is realized for the planetating motion in the primary system. In other words the retarding effect is unusually effective by reason of the increased forces which the weights develop by a high speed of rotation.

Referring again to the operation of the shifting rod 65, it will be noted that the guide block 70 for the rod serves as a stop abutment so as to prevent the dog clutch 38 from moving past its clutching engagement with the teeth 37 on the ring gear. The boss 105, the opposite end of the case, also serves as an abutment to limit the movement of the clutching member 52 so that it can not come into contact with the downwardly depending part 15 on the radial flange 13.

Having thus described and shown an embodiment of my invention, what I claim and desire to secure by Letters Patent of the United States is:

1. In a transmission, driving and driven shafts, planetary change speed mechanism connecting said shafts, comprising primary and secondary planetating gear systems and speed responsive means associated with one of said systems for automatically controlling the planetating motion in the other system, and inter-connected ring gears for said systems through which said control is transmitted.

2. In a transmission, driving and driven shafts, planetary change speed mechanism connecting said shafts, comprising primary and secondary planetating gear systems and speed responsive means associated with one of said systems for automatically controlling the planetating motion in the other system, and inter-connected floating ring gears for said systems through which said control is transmitted.

3. In a transmission, driving and driven shafts, planetary change speed mechanism connecting said shafts, comprising a primary planetating system, a secondary planetating system a ring gear for each of said systems, means interconnecting said ring gears, a sun gear in the primary system, means for connecting said sun gear with the driving shaft, a plurality of planetating gears in the primary system, a carrier for said planetating gears, means for connecting said carrier with the driven shaft, planet gears in the secondary system, a sun gear in the secondary system meshing with the planet gears thereof, a supplemental sun gear coacting with said secondary sun gear, a one-way clutch connecting the secondary and supplemental sun gears, and centrifugal weights driven by said supplemental sun gear for automatically controlling the planetating motion in the primary system.

4. In a transmission, driving and driven shafts, planetary change speed mechanism connecting said shafts, comprising a primary planetating system, a secondary planetating system, a sun gear in the primary system, means for connecting said sun gear with the driving shaft, a plurality of planetating gears in the primary system, a carrier for said planetating gears, means for connecting said carrier with the driven shaft, a sun gear in the secondary system, a supplemental sun gear coacting therewith, a one-way clutch connecting the secondary and supplemental sun gears, centrifugal weights driven by said supplemental sun gear for automatically controlling the planetating motion in the primary system, and a floating ring gear through which said control is transmitted.

5. In a transmission, driving and driven shafts, planetary change speed mechanism connecting said shafts, comprising a primary planetating system, a secondary planetating system, a sun gear in the primary system, means for connecting said sun gear with the driving shaft, a plurality of planetating gears in the primary system, a carrier for said planetating gears, means for connecting said carrier with the driven shaft, a sun gear in the secondary system, a supplemental sun gear coacting therewith through a one-way clutch, and centrifugal weights driven by said supplemental sun gear for automatically controlling the planetating motion in the primary system, and inter-connected floating ring gears for said systems through which said control is transmitted.

6. In an automatic transmission, driving and driven shafts, planetating change speed mechanism connecting said shafts, comprising a primary sun gear, means for connecting said sun gear with the driving shaft, a plurality of planetating gears meshing with said sun gear, a carrier for said planetating gears, a clutching device for connecting said carrier with the driven shaft, inter-connected floating ring gears with which said planetating gears also mesh, a plurality of secondary planetating gears, meshing with said ring gear, a secondary sun gear with which said secondary planetating gears also mesh, a supplemental sun gear associated with said secondary sun gear, a one-way clutching device connecting said secondary and supplemental sun gears, supplemental planetating gears meshing with said supplemental sun gear, and centrifugal weights rotatable with said supplemental planetating gears.

7. In an automatic tranmission, driving and driven shafts, planetating change speed mechanism connecting said shafts, comprising a primary sun gear, means for connecting said sun gear with the driving shaft, a plurality of planetating gears meshing with said sun gear, a carrier for said planetating gears, a clutching device for connecting said carrier with the driven shaft, a primary floating ring gear with which said planetating gears also mesh, a secondary floating ring gear connected to the primary ring gear, a plurality of secondary planetating gears meshing with said ring gear, a secondary sun gear with which said secondary planetating gears also mesh, a supplemental sun gear associated with said secondary sun gear, a one-way clutching device connecting said secondary and supplemental sun gears, supplemental planetating gears meshing with said supplemental sun gear, centrifugal weights rotatable with said supplemental planetating gears, a carrier for said supplemental planetating gears, a clutching connection between said carrier and the driving shaft, and means for reversing the drive in said mechanism, comprising means for disengaging the clutching connection between the carrier for the primary planetating gears and the driven shaft and the clutching connection between the carrier for the supplemental planetating gears and the driving shaft, means for arresting the rotation of the carrier for the supplemental planetating gears, means for arresting the rotation of the carrier for the primary planetating gears and means for connecting said ring gears in driving relation with the driven shaft.

8. In an automatic transmission, driving and driven shafts, planetating change speed mechanism connecting said shafts, comprising a primary sun gear, means for connecting said sun gear with the driving shaft, a plurality of planetating gears meshing with said sun gear, a carrier for said planetating gears, a clutching device for connecting said carrier with the driven shaft, a primary floating ring gear with said planetating gears also mesh, a secondary floating ring gear connected with said primary ring gear, a plurality of secondary planetating gears meshing with said secondary ring gear, a secondary sun gear with which said secondary planetating gears also mesh, a supplemental sun gear associated with said secondary sun gear, a one-way clutching device connecting said secondary and supplemental sun gears, supplemental planetating gears meshing with said supplemental sun gear, centrifugal weights rotatable with said supplemental planetating gears, a carrier for said supplemental planetating gears, a clutching connection between said carrier and the driving shaft, and means for reversing the drive in said mechanism, comprising means for disengaging the clutching connection between the carrier for the primary planetating gears and the driven shaft and the clutching connection between the carrier for the supplemental planetating gears and the driving shaft, means for arresting the rotation of the carrier for the supplemental planetating gears, means for arresting the rotation of the carrier for the primary planetating gears and means for connecting said ring gears in driving relation with the driven shaft, comprising a clutching dog in the clutching connection between the primary planetating gears and the driven shaft.

9. In an automatic transmission, driving and driven shafts, planetary change speed mechanism for connecting said shafts in different speed ratios, comprising primary and secondary planetating gear systems, interconnected ring gears for said systems, a plurality of planet gears in both systems, sun gears in both systems, carriers for the planet gears of both systems, means for connecting the sun gear of the primary system with the driving shaft, means for connecting the planet gear carrier of the secondary system with the driving shaft, means for connecting the planet carrier of the primary system with the driven shaft and means for automatically changing the speed ratio in said mechanism.

10. In an automatic transmission, driving and driven shafts, planetary change speed mechanism for connecting said shafts in different speed ratios, comprising primary and secondary planetating gear systems, interconnected ring gears for said systems, a plurality of planet gears in both systems, sun gears in both systems, carriers for the planet gears of both systems, means for connecting the sun gear of the primary system with the driving shaft, means for connecting the planet gear carrier of the secondary system with the driving shaft, means for connecting the planet carrier of the primary system with the driven shaft, axially on the driven shaft and means for automatically changing the speed ratio in said mechanism.

11. In a transmission, driving and driven shafts, speed changing mechanism for connecting said shafts in different speed ratios, comprising a sun gear, planet gears meshing with said sun gear, a carrier for said planet gears, a ring gear meshing with said planet gears, means for selectively connecting the planet carrier with the driven shaft for forward speeds or connecting the ring gear with the driven shaft for reversing speeds, and means for automatically changing the speed ratio in said mechanism, comprising a centrifugal device, means for driving said device, and a control imparting connection between said device and said ring gear, comprising a secondary planetary gear train, planet gears in said gear train, a secondary ring gear connected to said first named ring gear and meshing with said secondary planet gears, a sun gear meshing with said secondary planet gears, a supplemental sun gear, a one-way clutch connecting said supplemental and said secondary sun gears and planetating gearing connecting said supplemental sun gear with said centrifugal device, a planet carrier for said planetating gearing, means for connecting said carrier with the driving shaft when the first named carrier is connected with the driven shaft, and means for arresting the carrier for the planet gearing when the first named ring gear is connected with the driven shaft.

12. In a transmission, driving and driven shafts, planetary change speed mechanism for connecting said shafts in different speed ratios, comprising primary and secondary planetating gear systems, each having planet gears, ring gears meshing with the planet gears, a unitary mounting for said ring gears, a planet carrier for the planet gears in the primary system, means for connecting said planet carrier with the driven shaft for forward speeds, means for connecting the mounting for the ring gears with the driven shaft for reverse speeds, said mounting being free to float at forward speeds, a carrier for the planetating gears in the secondary system, means for connecting said carrier with the driving shaft when the carrier for the planetating gears in the primary system is connected with the driven shaft, means for arresting the rotation of the carrier in the secondary system when disconnected from the driving shaft, means for arresting the rotation of the carrier for the planetating gears in the primary system when the unitary mounting for said ring gears is connected to the driven shaft and means for automatically changing the speed ratio in the mechanism, comprising a series of centrifugal weights, planet shafts on which said weights are mounted, said shafts being journaled in the planet carrier of the secondary system, supplemental planet gears on said shafts, a sun gear meshing with said supplemental planet gears, and a one-way clutch connecting said supplemental sun gear with the secondary gear system.

13. In a transmission, driving and driven elements, planetary speed changing mechanism for connecting said elements in different speed ratios, comprising a planetary gear train including a rotatable ring gear and means for retarding the rotation of said ring gear in one direction for automatically changing the speed ratio in the mechanism, comprising a centrifugal weight controlled gear train and a control transmitting connection between said gear train and said ring gear.

14. In a transmission, driving and driven elements, planetary speed changing mechanism for connecting said elements in different speed ratios, comprising a planetary gear train including a rotatable ring gear and means for retarding the rotation of said ring gear in one direction for automatically changing the speed ratio in the mechanism, comprising a centrifugal controlled reduction gearing and a control transmitting connection between said reduction gearing and said ring gear.

15. In a transmission, driving and driven elements, speed changing mechanism for connecting said elements in different speed ratios, comprising primary and secondary planetary gear systems, a ring gear in each of said systems, means connecting said ring gears, and means for automatically changing the speed ratio comprising a centrifugal responsive device and a control transmitting connection between said device and one of said systems.

16. In a transmission, driving and driven elements, speed changing mechanism for connecting said elements in different speed ratios, comprising primary and secondary planetary gear systems, drive imparting means for inter-connecting said systems, and means for automatically changing the speed ratio, comprising a supplemental gear train, a one-way clutch connecting said gear train with one of said planetary gear systems and a centrifugal responsive device in said supplemental gear train.

In testimony whereof I have hereunto subscribed by name.

KENNETH E. LYMAN.